United States Patent
Onishi

(10) Patent No.: US 6,735,648 B2
(45) Date of Patent: May 11, 2004

(54) USB INTERFACE-COMPATIBLE COMPUTER PERIPHERAL UNIT

(75) Inventor: Nahiriho Onishi, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 279 days.

(21) Appl. No.: 09/960,681

(22) Filed: Sep. 21, 2001

(65) Prior Publication Data

US 2002/0038395 A1 Mar. 28, 2002

(30) Foreign Application Priority Data

Sep. 26, 2000 (JP) .................................... 2000-291633

(51) Int. Cl.⁷ .............................................. G06F 13/00
(52) U.S. Cl. ............................. 710/62; 710/8; 710/15; 710/16; 710/18; 710/305; 713/323
(58) Field of Search .................... 710/8, 15, 16, 710/18, 305, 62; 713/323

(56) References Cited

U.S. PATENT DOCUMENTS 5,216,343 A * 6/1993 Genheimer et al. .... 318/568.18
5,884,086 A * 3/1999 Amoni et al. ................ 713/300
6,061,220 A * 5/2000 Ohmori et al. ............... 361/84
6,233,212 B1 * 5/2001 Kaaden ...................... 369/53.3
6,415,342 B1 * 7/2002 Wahl et al. .................. 710/100
6,460,143 B1 * 10/2002 Howard et al. ............. 713/323
6,600,779 B1 * 7/2003 Sawada et al. ............. 375/233

FOREIGN PATENT DOCUMENTS

JP          2000-29544          1/2000

* cited by examiner

Primary Examiner—Rehana Perveen
(74) Attorney, Agent, or Firm—Brinks Hofer Gilson & Lione

(57) ABSTRACT

Switching means has a first input section for receiving bus power through a USB interface and a second input section for receiving higher power than the bus power and can switch the power supply route from one of the input sections to the other. When power supply from the second input section is started, a CPU recognizes the power supply through detecting means and uses the switching means to switch the power supply route to the route for the second input section. This makes it possible to supply higher power, thereby increasing the rotating speed of a spindle motor to improve a data transfer rate.

3 Claims, 1 Drawing Sheet

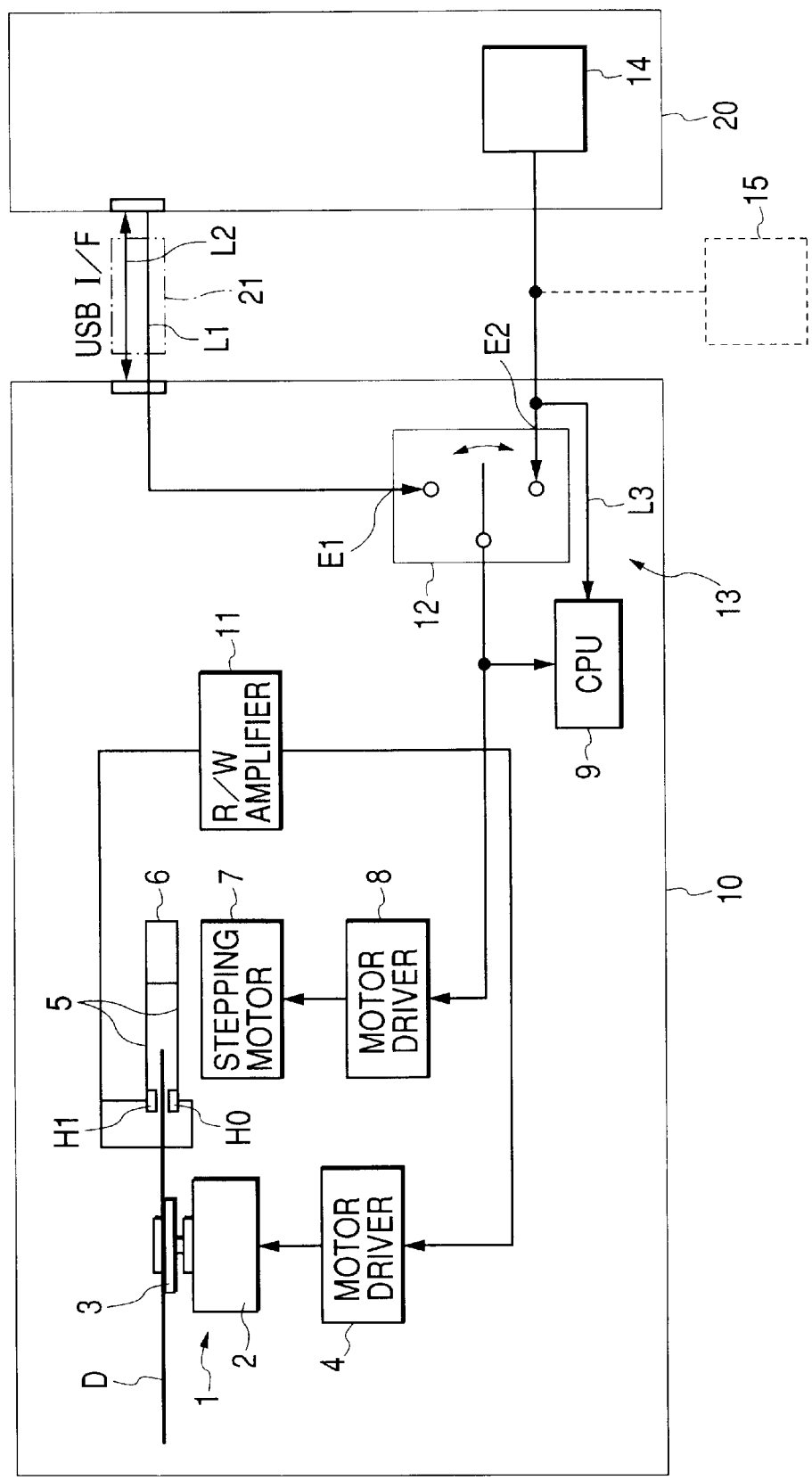

USB INTERFACE-COMPATIBLE COMPUTER PERIPHERAL UNIT

BACKGROUND OF THE INVENTION

1. Field of the Invention

The present invention relates to a computer peripheral unit which is compatible with a Universal Serial Bus (hereinafter referred to as USB) interface and particularly to a computer peripheral unit which requires more than the level of power which a USB interface can supply.

2. Description of Related Art

In recent years, there has been a tendency for USB interface-compatible computer peripheral units to be increasingly used. In addition to USB interface-compatible mice and keyboards, for example, some floppy disk drives are compatible with USB interfaces.

A conventional USB interface-compatible floppy disk drive is connected with a computer only via a USB cable. The USB cable includes power supply wires through which power is supplied to the floppy disk drive. The power supplied to the floppy disk drive in this way is up to 500 mA in accordance with the USB interface specification. The voltage is constant at 5V.

The abovementioned conventional floppy disk drive incorporates devices with relatively large power consumption, such as a spindle motor for rotating the disk and a stepping motor for moving the heads. Therefore, if the floppy disk drive is connected at an end of the power supply line on which a plurality of computer peripheral units are connected using a USB hub, the maximum power which can be supplied to it would be smaller than the abovementioned level or 500 mA, leading to a problem that the floppy drive does not work.

When a USB interface is used, a data transfer rate can be higher than in the conventional floppy disk drive. However, in order to increase the data transfer rate, the rotating speed of the disk must be increased. However, because the maximum power available to it is 500 mA in accordance with the USB interface specification as mentioned above, it is impossible to supply sufficient power to increase the rotating speed.

To solve the above problem, the present invention provides a computer peripheral unit which can supply sufficient power to improve performance and increase a processing speed, not subject to the power supply limitation by a USB interface specification.

SUMMARY OF THE INVENTION

The present invention provides a computer peripheral unit which is connected with a main computer unit through a Universal Serial Bus interface, the peripheral unit comprising: a first input section which receives bus power fed through a bus on the Universal Serial Bus interface; a second input section which receives higher power than the abovementioned bus power; and a control section which determines whether the power being supplied is bus power from the first input section or power from the second input section.

Preferably, the peripheral unit has detecting means for detecting power supply from the second input section and a detection signal from which the detecting means is given to the control section to switch a power supply route to a route for the second input section.

According to the present invention, when power is supplied from the second input section, it can be recognized by the control section and finally the performance of the connected peripheral unit can be improved. When two or more peripheral units are connected, even if a peripheral unit with large power consumption is connected at the end of the power supply line, power can be supplied from the second input section according to the decision by the control section, thereby preventing the unit from failing to operate.

For example, the peripheral unit may be a disk drive which can house a disk and perform recording and/or reproduction while the disk is rotating, wherein the disk is rotated at a higher speed than a regular rotating speed when power is supplied from the second input section.

With the abovementioned constitution, the rate of data transfer between the computer and peripheral unit can be increased, thereby reducing the processing time.

BRIEF DESCRIPTION OF THE DRAWING

FIG. 1 is a block diagram showing a computer peripheral unit according to the present invention.

DESCRIPTION OF THE PREFERRED EMBODIMENT

Next, a computer peripheral unit according to the present invention will be described referring to the attached drawing. FIG. 1 is a block diagram showing one example of a computer peripheral unit according to the present invention. Although an explanation is given below about a floppy disk drive (peripheral unit) 10 which is externally connected with a main computer unit 20, the invention is not limited to this structure; a structure that the floppy disk drive 10 is incorporated in the main computer unit 20 is also acceptable.

A floppy disk drive 10 as shown in FIG. 1 is compatible with a USB interface. It is connected to a main computer unit 20 via a USB cable 21. The USB cable 21 is composed of four wires: a pair of power supply lines L1 (Vcc and GND) and a pair of signal lines L2 (D+, D−). A signal with positive potential and a signal with negative potential are given to the signal lines L2, respectively, for serial transmission and reception.

The floppy disk drive 10 is provided with a rotation drive 1. The rotation drive 1 is composed of a spindle motor 2, a turntable 3 and a motor driver 4; the center of a disk D is clamped to the turntable 3, which turns as the spindle motor 2 turns. The disk D may be, for example, a flexible, low-capacity disk whose surface is coated with magnetic material. The disk D is inserted from outside the floppy disk drive 10 and loaded into the rotation drive 1. The spindle motor 2 is driven and controlled by the motor driver 4.

In the floppy disk drive 10, a magnetic head H0 is attached on the side "0" of the disk D and a magnetic head H1 is attached on the side "1" of the disk D, facing the magnetic head H0 in a way that the disk D is situated between the heads. These heads are supported by a head base 6 through support arms 5. The head base 6 is driven in the radial direction of the disk D by means of a stepping motor 7. The stepping motor 7 is driven and controlled by a motor driver 8. The heads H0 and H1 are connected to a R/W (read/write) amplifier 11 and so on.

The floppy disk drive 10 has a CPU 9 as a control section and a switching means 12. The CPU9 gives the motor drivers 4 and 8 control signals for controlling the spindle motor 2 and stepping motor 7 respectively, and controls timings for writing data onto the disk D or reproducing it and a seek operation and the like.

The switching means 12 has a first input section E1 which receives bus power through the bus on the USB interface of the main computer unit 20, and a second input section E2 which can receive a higher power than the abovementioned bus power; it can switch between the first input section E1 and the second input section E2.

The main computer unit 20, which is run under a given operating system, incorporates driver software for the floppy disk drive 10 which is compatible with the operating system. This enables transfer of recording and reproducing data between the main computer unit 20 and the floppy disk drive 10.

Inside the main computer unit 20, there is an internal power supply circuit 14 which is connected to the floppy disk drive 10 via a prescribed power cable. The internal power supply circuit 14 is designed to be able to supply the second input section E2 with a higher power than the abovementioned bus power supplied through the USB interface. Alternatively, the floppy disk drive 10 may be connected to an external power supply circuit 15 located outside the main computer unit 20 as indicated by dotted line in the figure. Likewise, in this case, a higher power than the bus power can be supplied to the second input section E2.

The floppy disk drive 10 has detecting means 13 on the line from the internal power supply circuit 14 or external power supply circuit 15 to the second input section E2. This detecting means 13 is connected to the CPU9 through a detecting line L3.

The switching means 12 may be connected to the second input section E2 or the first input section E1 when power is supplied to the floppy disk drive 10 from the power supply circuit 14 or 15.

Next, an explanation will be given of how the floppy disk drive 10 works when it is connected with the main computer unit 20. The explanation assumes that the main computer unit 20 is turned on.

When the internal power supply circuit 14 or external power supply circuit 15 is connected to the floppy disk drive 10, power from the internal power supply circuit 14 or external power supply circuit 15 is supplied to the second input section E2. At this time, a detection signal telling that the internal power supply circuit 14 or external power supply circuit 15 is connected is sent to the CPU 9 through the detecting line L3. As the CPU 9 senses the detection signal, it acknowledges that power is supplied from the internal power supply circuit 14 or external power supply circuit 15 and controls the switching means 12 for switching to the second input section E2. The power thus supplied is fed to the spindle motor 2, stepping motor 7, CPU 9 and any other part which requires the power. In this case, if, for example, 5 V power is supplied to the second input section E2, the limitation (a maximum of 500 mA) is not imposed, so a higher power than the bus power supplied through the USB interface can be supplied to the floppy disk drive 10.

When the floppy disk drive 10 is connected to the main computer unit 20 through the USB cable 21, the main computer unit 20 recognizes that it is connected with the floppy disk drive 10 and begins polling to the floppy disk drive 10. With this polling, the floppy disk drive 10 issues a command for the use of the internal power supply circuit 14 or external power supply circuit 15 to the main computer unit 20.

The main computer unit 20 may respond to the command in either of the two ways: it stops supplying the bus power through the USB interface or continues supplying the bus power. This can be freely chosen on the operating system of the main computer unit 20. It is also acceptable that, according to the judgment by the CPU 9, the computer is usually connected with the first input section E1 and, only when necessary, connected with the second input section E2.

As mentioned above, the CPU 9 in the floppy disk drive 10 can know whether power is being supplied either from the internal power supply circuit 14 or external power supply circuit 15, or through the bus from the USB interface. Consequently, it is possible that, when the internal power supply circuit 14 or external power supply circuit 15 is connected with the floppy disk drive 10, the CPU 9 selects the power from the internal power supply circuit 14 or external power supply circuit 15 to double the rotating speed of, for example, the spindle motor 2 to improve the data transfer rate.

As a recording signal is sent from the main computer unit 20, it is formatted by the CPU 9 and sent to the heads H0 and H1 through the R/W amplifier 11. The signal read from the disk D by the heads H1 and H0 is given to the CPU 9 through the R/W amplifier 11 and decoded and sent to the main computer unit 20. The CPU 9 has a buffer memory or the like which stores the data to be transferred between the main computer unit 20 and it.

On the other hand, when the floppy disk drive 10 is connected to the main computer unit 20 only through the USB cable 21 and not connected to the internal power supply circuit 14 or external power supply circuit 15, then the CPU 9 detects through the detecting means 13 that the second input section E2 has 0 V potential or is open, recognizes that power is not being supplied from the internal power supply circuit 14 or external power supply circuit 15, and controls the switching means 12 to switch from the second input section E2 to the first input section E1. At the same time, the CPU 9 issues, to the main computer unit 20, a command to notify that it is going to use the bus power. As a result, the floppy disk drive 10 continues running with a performance achievable through a maximum of 500 mA bus power. When the internal power supply circuit 14 or external power supply circuit 15 is connected again, the floppy disk drive 10 can run with a higher performance.

The floppy disk drive 10 which is configured as stated above may be a floppy disk drive which is externally connected with, or built in, a battery-powered computer. In such a case, it can work as follows: if it is externally connected, power is supplied from the external power supply circuit, or if it is built in the computer, power is supplied through a power supply route different from the one for bus power, so that the CPU 9 recognizes that the abovementioned power supply has been started, and enables processing at double speed.

The present invention should not be interpreted as limited to a floppy disk drive but it may be in another form such as a disk drive for compact disks (CD), digital versatile disks (DVD) or magneto optical disks (MO).

As explained above, according to the present invention, it is ensured that a peripheral unit runs securely even if it requires higher power than the upper limit of power imposed by a USB interface specification. If the peripheral unit according to the present invention is a floppy disk drive, the rotating speed of the spindle motor can be increased to improve the processing speed.

What is claimed is:

1. A computer peripheral unit which is connected with a main computer unit through a Universal Serial Bus interface, the peripheral unit comprising:
a first input section which receives bus power as fed through a bus on the Universal Serial Bus interface;
a second input section which receives higher power than the bus power through a route other than a conductor on the Universal Serial Bus interface; and
a control section which determines whether the power being supplied is bus power from the first input section or power from the second input section.

2. The computer peripheral unit according to claim 1, wherein the peripheral unit has a detector to detect power supply from the second input section, and wherein a detection signal from the detector is given to the control section to switch a power supply route to a route for the second input section.

3. The computer peripheral unit according to claim 1, wherein the peripheral unit is a disk drive which can house a disk and perform at least one of recording, and reproduction while the disk is rotating, and wherein the disk is rotated at a higher rotating speed than a regular rotating speed when power is supplied from the second input section.

* * * * *